US012778208B2

(12) United States Patent
Sur et al.

(10) Patent No.: US 12,778,208 B2
(45) **Date of Patent: *Nov. 3, 2026**

(54) FLUIDIC CONTROL FOR AN AEROSOL DELIVERY DEVICE

(71) Applicant: RAI Strategic Holdings, Inc., Winston-Salem, MA (US)

(72) Inventors: Rajesh Sur, Winston Salem, NC (US); Stephen B. Sears, Winston-Salem, NC (US); Eric T. Hunt, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 266 days.

This patent is subject to a terminal disclaimer.

(21) Appl. No.: 18/443,811

(22) Filed: Feb. 16, 2024

(65) Prior Publication Data

US 2024/0225121 A1 Jul. 11, 2024

Related U.S. Application Data

(63) Continuation of application No. 15/261,307, filed on Sep. 9, 2016, now Pat. No. 11,937,647.

(51) Int. Cl.
*A24F 40/53* (2020.01)
*A24F 40/10* (2020.01)
(Continued)

(52) U.S. Cl.
CPC ............ *A24F 40/53* (2020.01); *A24F 40/485* (2020.01); *A24F 40/51* (2020.01); (Continued)

(58) Field of Classification Search
None
See application file for complete search history.

(56) References Cited

U.S. PATENT DOCUMENTS

| | | | |
|---|---|---|---|
| 1,771,366 | A | 7/1930 | Wyss et al. |
| 2,057,353 | A | 10/1936 | Whittemore, Jr. |

(Continued)

FOREIGN PATENT DOCUMENTS

| | | | |
|---|---|---|---|
| AU | 276250 | A | 7/1965 |
| CA | 2641869 | A1 | 5/2010 |

(Continued)

OTHER PUBLICATIONS

EPO, Extended European Search Report for EP App. No. 25180844.0, Nov. 11, 2025, pp. 1-11.

*Primary Examiner* — Thor S Campbell
(74) *Attorney, Agent, or Firm* — Womble Bond Dickinson (US) LLP; Chris Humphrey; John V. Forcier

(57) ABSTRACT

An aerosol delivery device is provided that includes a reservoir configured to retain aerosol precursor composition, a valve configured to control a flow of aerosol precursor composition from the reservoir to a heating element controllable to activate and vaporize components of the aerosol precursor composition, a sensor configured to measure reflectance or temperature at the heating element and generate a signal corresponding to the reflectance or temperature so measured, and a control component. The control component controls operation of the valve including receiving the signal and based thereon determining a volume of aerosol precursor composition at the heating element, and causing the valve to decrease or increase a rate of the flow of aerosol precursor composition in response to the volume being respectively above or below a predetermined threshold volume.

14 Claims, 5 Drawing Sheets

(51) Int. Cl.
*A24F 40/485* (2020.01)
*A24F 40/51* (2020.01)
*G01F 23/292* (2006.01)
*H05B 1/02* (2006.01)

(52) U.S. Cl.
CPC ....... *G01F 23/2928* (2013.01); *H05B 1/0244* (2013.01); *A24F 40/10* (2020.01); *H05B 2203/021* (2013.01)

(56) References Cited

U.S. PATENT DOCUMENTS

| | | | | |
|---|---|---|---|---|
| 2,104,266 | A | 1/1938 | McCormick | |
| 3,200,819 | A | 8/1965 | Gilbert | |
| 4,284,089 | A | 8/1981 | Ray | |
| 4,303,083 | A | 12/1981 | Burruss, Jr. | |
| 4,735,217 | A | 4/1988 | Gerth et al. | |
| 4,848,374 | A | 7/1989 | Chard et al. | |
| 4,907,606 | A | 3/1990 | Lilja et al. | |
| 4,922,901 | A | 5/1990 | Brooks et al. | |
| 4,945,931 | A | 8/1990 | Gori | |
| 4,947,874 | A | 8/1990 | Brooks et al. | |
| 4,947,875 | A | 8/1990 | Brooks et al. | |
| 4,986,286 | A | 1/1991 | Roberts et al. | |
| 5,019,122 | A | 5/1991 | Clearman et al. | |
| 5,042,510 | A | 8/1991 | Curtiss et al. | |
| 5,054,319 | A | 10/1991 | Fling | |
| 5,060,671 | A | 10/1991 | Counts et al. | |
| 5,093,894 | A | 3/1992 | Deevi et al. | |
| 5,144,962 | A | 9/1992 | Counts et al. | |
| 5,249,586 | A | 10/1993 | Morgan et al. | |
| 5,261,424 | A | 11/1993 | Sprinkel, Jr. | |
| 5,322,075 | A | 6/1994 | Deevi et al. | |
| 5,353,813 | A | 10/1994 | Deevi et al. | |
| 5,369,723 | A | 11/1994 | Counts et al. | |
| 5,372,148 | A | 12/1994 | McCafferty et al. | |
| 5,388,574 | A | 2/1995 | Ingebrethsen | |
| 5,408,574 | A | 4/1995 | Deevi et al. | |
| 5,468,936 | A | 11/1995 | Deevi et al. | |
| 5,498,850 | A | 3/1996 | Das | |
| 5,515,842 | A | 5/1996 | Ramseyer et al. | |
| 5,530,225 | A | 6/1996 | Hajaligol | |
| 5,564,442 | A | 10/1996 | MacDonald et al. | |
| 5,649,554 | A | 7/1997 | Sprinkel et al. | |
| 5,666,977 | A | 9/1997 | Higgins et al. | |
| 5,687,746 | A | 11/1997 | Rose et al. | |
| 5,726,421 | A | 3/1998 | Fleischhauer et al. | |
| 5,727,571 | A | 3/1998 | Meiring et al. | |
| 5,743,251 | A | 4/1998 | Howell et al. | |
| 5,799,663 | A | 9/1998 | Gross et al. | |
| 5,819,756 | A | 10/1998 | Mielordt | |
| 5,865,185 | A | 2/1999 | Collins et al. | |
| 5,865,186 | A | 2/1999 | Volsey, II | |
| 5,878,752 | A | 3/1999 | Adams et al. | |
| 5,894,841 | A | 4/1999 | Voges | |
| 5,934,289 | A | 8/1999 | Watkins et al. | |
| 5,954,979 | A | 9/1999 | Counts et al. | |
| 5,967,148 | A | 10/1999 | Harris et al. | |
| 6,040,560 | A | 3/2000 | Fleischhauer et al. | |
| 6,053,176 | A | 4/2000 | Adams et al. | |
| 6,089,857 | A | 7/2000 | Matsuura et al. | |
| 6,095,153 | A | 8/2000 | Kessler et al. | |
| 6,125,853 | A | 10/2000 | Susa et al. | |
| 6,155,268 | A | 12/2000 | Takeuchi | |
| 6,164,287 | A | 12/2000 | White | |
| 6,196,218 | B1 | 3/2001 | Voges | |
| 6,196,219 | B1 | 3/2001 | Hess et al. | |
| 6,516,796 | B1 | 2/2003 | Cox et al. | |
| 6,598,607 | B2 | 7/2003 | Adiga et al. | |
| 6,601,776 | B1 | 8/2003 | Oljaca et al. | |
| 6,615,840 | B1 | 9/2003 | Fournier et al. | |
| 6,688,313 | B2 | 2/2004 | Wrenn et al. | |
| 6,772,756 | B2 | 8/2004 | Shayan | |
| 6,803,545 | B2 | 10/2004 | Blake et al. | |
| 6,854,461 | B2 | 2/2005 | Nichols et al. | |
| 6,854,470 | B1 | 2/2005 | Pu | |
| 7,117,867 | B2 | 10/2006 | Cox et al. | |
| 7,293,565 | B2 | 11/2007 | Griffin et al. | |
| 7,513,253 | B2 | 4/2009 | Kobayashi et al. | |
| 7,775,459 | B2 | 8/2010 | Martens, III et al. | |
| 7,832,410 | B2 | 11/2010 | Hon | |
| 7,845,359 | B2 | 12/2010 | Montaser | |
| 7,896,006 | B2 | 3/2011 | Hamano et al. | |
| 8,127,772 | B2 | 3/2012 | Montaser | |
| 8,314,591 | B2 | 11/2012 | Terry et al. | |
| 8,365,742 | B2 | 2/2013 | Hon | |
| 8,402,976 | B2 | 3/2013 | Fernando et al. | |
| 8,499,766 | B1 * | 8/2013 | Newton | A24F 40/51 131/273 |
| 8,528,569 | B1 | 9/2013 | Newton | |
| 8,550,069 | B2 | 10/2013 | Alelov | |
| 8,851,081 | B2 | 10/2014 | Fernando et al. | |
| 9,603,386 | B2 * | 3/2017 | Xiang | A24F 40/50 |
| 9,675,114 | B2 * | 6/2017 | Timmermans | A24F 40/60 |
| 9,808,032 | B2 * | 11/2017 | Yamada | A61M 11/042 |
| 9,814,263 | B2 * | 11/2017 | Cochand | A61M 15/06 |
| 11,937,647 | B2 * | 3/2024 | Sur | A24F 40/51 |
| 2002/0146242 | A1 | 10/2002 | Vieira | |
| 2003/0226837 | A1 | 12/2003 | Blake et al. | |
| 2004/0118401 | A1 | 6/2004 | Smith et al. | |
| 2004/0129280 | A1 | 7/2004 | Woodson et al. | |
| 2004/0200488 | A1 | 10/2004 | Felter et al. | |
| 2004/0226568 | A1 | 11/2004 | Takeuchi et al. | |
| 2005/0016550 | A1 | 1/2005 | Katase | |
| 2005/0034723 | A1 * | 2/2005 | Bennett | A61K 9/007 128/203.12 |
| 2006/0016453 | A1 | 1/2006 | Kim | |
| 2006/0032501 | A1 | 2/2006 | Hale et al. | |
| 2006/0047368 | A1 | 3/2006 | Maharajh et al. | |
| 2006/0196518 | A1 | 9/2006 | Hon | |
| 2007/0074734 | A1 | 4/2007 | Braunshteyn et al. | |
| 2007/0102013 | A1 | 5/2007 | Adams et al. | |
| 2007/0215167 | A1 | 9/2007 | Llewellyn Crooks et al. | |
| 2007/0283972 | A1 * | 12/2007 | Monsees | A24F 40/40 131/273 |
| 2008/0038363 | A1 * | 2/2008 | Zaffaroni | A61M 11/041 424/502 |
| 2008/0085103 | A1 | 4/2008 | Beland et al. | |
| 2008/0092912 | A1 | 4/2008 | Robinson et al. | |
| 2008/0216833 | A1 | 9/2008 | Pujol et al. | |
| 2008/0257367 | A1 | 10/2008 | Paterno et al. | |
| 2008/0276947 | A1 | 11/2008 | Martzel | |
| 2008/0302374 | A1 | 12/2008 | Wengert et al. | |
| 2009/0095287 | A1 * | 4/2009 | Emarlou | A61M 15/06 128/200.14 |
| 2009/0095311 | A1 | 4/2009 | Han | |
| 2009/0095312 | A1 | 4/2009 | Herbrich et al. | |
| 2009/0126745 | A1 | 5/2009 | Hon | |
| 2009/0188490 | A1 | 7/2009 | Han | |
| 2009/0230117 | A1 | 9/2009 | Fernando et al. | |
| 2009/0272379 | A1 | 11/2009 | Thorens et al. | |
| 2009/0283103 | A1 | 11/2009 | Nielsen et al. | |
| 2009/0320863 | A1 | 12/2009 | Fernando et al. | |
| 2010/0043809 | A1 | 2/2010 | Magnon | |
| 2010/0083959 | A1 | 4/2010 | Siller | |
| 2010/0181387 | A1 * | 7/2010 | Zaffaroni | A61M 11/042 239/128 |
| 2010/0200006 | A1 | 8/2010 | Robinson et al. | |
| 2010/0229881 | A1 | 9/2010 | Hearn | |
| 2010/0242974 | A1 | 9/2010 | Pan | |
| 2010/0307518 | A1 | 12/2010 | Wang | |
| 2010/0313901 | A1 * | 12/2010 | Fernando | B65D 43/16 131/330 |
| 2011/0005535 | A1 | 1/2011 | Xiu | |
| 2011/0011396 | A1 | 1/2011 | Fang | |
| 2011/0036346 | A1 * | 2/2011 | Cohen | A24F 40/60 128/200.14 |
| 2011/0036363 | A1 | 2/2011 | Urtsev et al. | |
| 2011/0036365 | A1 | 2/2011 | Chong et al. | |
| 2011/0094523 | A1 | 4/2011 | Thorens et al. | |
| 2011/0126848 | A1 | 6/2011 | Zuber et al. | |
| 2011/0155153 | A1 | 6/2011 | Thorens et al. | |
| 2011/0155718 | A1 | 6/2011 | Greim et al. | |

(56) References Cited

U.S. PATENT DOCUMENTS

2011/0168194 A1 7/2011 Hon
2011/0265806 A1 11/2011 Alarcon et al.
2011/0309157 A1 12/2011 Yang et al.
2012/0042885 A1 2/2012 Stone et al.
2012/0048266 A1* 3/2012 Alelov .............. A61M 15/0003 128/203.14
2012/0060853 A1 3/2012 Robinson et al.
2012/0090630 A1* 4/2012 Hon ........................ A24F 40/60 131/273
2012/0111347 A1 5/2012 Hon
2012/0132643 A1 5/2012 Choi et al.
2012/0227752 A1 9/2012 Alelov
2012/0231464 A1 9/2012 Yu et al.
2012/0260927 A1 10/2012 Liu
2012/0279512 A1 11/2012 Hon
2012/0318882 A1 12/2012 Abehasera
2013/0037041 A1 2/2013 Worm et al.
2013/0042865 A1* 2/2013 Monsees ................. A24F 40/53 128/203.27
2013/0056013 A1 3/2013 Terry et al.
2013/0081625 A1 4/2013 Rustad et al.
2013/0081642 A1 4/2013 Safari
2013/0104916 A1* 5/2013 Bellinger .............. A61M 15/06 131/328
2013/0192619 A1 8/2013 Tucker et al.
2013/0255702 A1 10/2013 Griffith, Jr. et al.
2013/0284192 A1* 10/2013 Peleg ...................... A24F 40/53 131/329
2013/0306084 A1 11/2013 Flick
2013/0319439 A1 12/2013 Gorelick et al.
2013/0319440 A1* 12/2013 Capuano ............... A61M 15/06 131/329
2013/0340750 A1 12/2013 Thorens et al.
2013/0340775 A1* 12/2013 Juster .................. H04L 12/1827 131/273
2014/0000638 A1 1/2014 Sebastian et al.
2014/0020693 A1 1/2014 Cochand et al.
2014/0053856 A1* 2/2014 Liu ......................... A24F 40/51 131/329
2014/0060554 A1* 3/2014 Collett .................... A24F 40/30 392/386
2014/0060555 A1 3/2014 Chang et al.
2014/0096781 A1 4/2014 Sears et al.
2014/0096782 A1 4/2014 Ampolini et al.
2014/0107815 A1* 4/2014 LaMothe ................ A24F 15/01 700/90
2014/0109921 A1 4/2014 Chen
2014/0123989 A1* 5/2014 LaMothe .......... A61M 15/0003 131/328
2014/0123990 A1* 5/2014 Timmermans .......... A24F 40/60 131/328
2014/0157583 A1 6/2014 Ward et al.
2014/0174459 A1* 6/2014 Burstyn .................. A24F 40/60 131/273
2014/0209105 A1 7/2014 Sears et al.
2014/0224267 A1* 8/2014 Levitz ..................... A24F 40/40 320/108
2014/0246035 A1* 9/2014 Minskoff ................ A24F 40/65 131/329
2014/0251324 A1* 9/2014 Xiang ..................... A24F 40/50 128/202.21
2014/0253144 A1 9/2014 Novak, III et al.
2014/0261408 A1 9/2014 DePiano et al.
2014/0261486 A1 9/2014 Potter et al.
2014/0261487 A1 9/2014 Chapman et al.
2014/0261495 A1 9/2014 Novak, III et al.
2014/0270727 A1 9/2014 Ampolini et al.
2014/0270729 A1 9/2014 DePiano et al.
2014/0270730 A1 9/2014 DePiano et al.
2014/0305820 A1* 10/2014 Xiang ..................... A24F 40/95 206/236
2014/0334804 A1* 11/2014 Choi ..................... A24F 40/485 392/404
2014/0345631 A1 11/2014 Bowen et al.
2014/0360512 A1* 12/2014 Xiang ................. H02J 7/00712 131/328
2015/0007838 A1 1/2015 Fernando et al.
2015/0047662 A1* 2/2015 Hopps ................... A61M 15/06 392/394
2015/0053217 A1* 2/2015 Steingraber ............. A24F 40/50 131/329
2015/0075546 A1* 3/2015 Kueny, Sr. .............. A24F 40/65 700/299
2015/0122252 A1* 5/2015 Frija ....................... A24F 40/65 128/202.21
2015/0173124 A1* 6/2015 Qiu ......................... A24F 40/60 131/328
2015/0216237 A1 8/2015 Wensley et al.
2015/0224268 A1* 8/2015 Henry ..................... A24F 40/90 128/202.21
2015/0237917 A1* 8/2015 Lord ....................... A24F 40/53 131/328
2015/0245661 A1* 9/2015 Milin ...................... A24F 40/40 131/329
2015/0257445 A1* 9/2015 Henry, Jr. ............... A24F 40/53 131/328
2015/0257448 A1* 9/2015 Lord .................. G05B 23/0267 700/90
2015/0258289 A1* 9/2015 Henry, Jr. ............. A61M 15/06 128/202.21
2015/0288468 A1* 10/2015 Xiang ..................... A24F 40/65 455/500
2015/0320116 A1* 11/2015 Bleloch ................... A24F 40/44 219/628
2015/0357839 A1* 12/2015 Cai ..................... H02J 7/00714 131/329
2015/0359263 A1* 12/2015 Bellinger ................ A24F 40/53 392/394
2016/0007651 A1* 1/2016 Ampolini ................ G06F 13/42 131/328
2016/0021930 A1* 1/2016 Minskoff ................ A24F 40/51 392/395
2016/0037826 A1 2/2016 Hearn et al.
2016/0106156 A1* 4/2016 Qiu ..................... H02J 7/00712 392/404
2016/0106936 A1 4/2016 Kimmel
2016/0150828 A1* 6/2016 Goldstein ................ H05B 6/36 392/387
2016/0198767 A1 7/2016 Verleur
2016/0202108 A1 7/2016 Kopansky et al.
2016/0219938 A1* 8/2016 Mamoun ................ G05B 15/02
2016/0285983 A1* 9/2016 Liu ........................ G16H 40/67
2016/0331024 A1* 11/2016 Cameron ................ A24F 40/50
2016/0331026 A1* 11/2016 Cameron ................ A24F 40/50
2016/0331027 A1* 11/2016 Cameron ................ B05B 15/40
2016/0331035 A1* 11/2016 Cameron ................ H04M 1/21
2016/0331859 A1* 11/2016 Cameron ................ A24F 40/51
2016/0337362 A1* 11/2016 Cameron ........... G06Q 20/3278
2016/0338407 A1* 11/2016 Kerdemelidis ......... A24F 40/60
2016/0345628 A1* 12/2016 Sabet ...................... H04M 1/21
2016/0360786 A1* 12/2016 Bellinger ............. H05B 1/0227
2016/0363917 A1* 12/2016 Blackley ............... G06F 3/0488
2016/0374401 A1* 12/2016 Liu ......................... A24F 40/50 131/328
2017/0020192 A1* 1/2017 Fregonese ............. A24F 40/485
2017/0027229 A1 2/2017 Cameron
2017/0042230 A1* 2/2017 Cameron ................ A24F 40/60
2017/0042231 A1* 2/2017 Cameron ................ A24F 40/65
2017/0045994 A1* 2/2017 Murison ............... A61M 15/06
2017/0046357 A1* 2/2017 Cameron ................ A24F 40/30
2017/0046738 A1* 2/2017 Cameron ................ A24F 40/65
2017/0048930 A1 2/2017 Marsh et al.
2017/0055588 A1* 3/2017 Cameron .............. A61M 15/06
2017/0064999 A1* 3/2017 Perez ..................... B65D 85/54
2017/0079327 A1* 3/2017 Wu ......................... H02J 7/007
2017/0079329 A1* 3/2017 Zitzke .................. H05B 1/0225
2017/0086496 A1* 3/2017 Cameron .................. B25F 1/04
2017/0086497 A1* 3/2017 Cameron ............. H05B 1/0244
2017/0086503 A1* 3/2017 Cameron ................ A24F 40/40
2017/0086504 A1* 3/2017 Cameron ................ A24F 40/48

(56) References Cited

U.S. PATENT DOCUMENTS

| | | | | |
|---|---|---|---|---|
| 2017/0086505 | A1* | 3/2017 | Cameron | A24F 40/50 |
| 2017/0086507 | A1* | 3/2017 | Rado | H05B 3/44 |
| 2017/0091490 | A1* | 3/2017 | Cameron | G06F 21/84 |
| 2017/0092106 | A1* | 3/2017 | Cameron | A24F 40/65 |
| 2017/0093960 | A1* | 3/2017 | Cameron | H04W 4/80 |
| 2017/0093981 | A1* | 3/2017 | Cameron | A24F 40/65 |
| 2017/0119058 | A1* | 5/2017 | Cameron | A24B 15/167 |
| 2017/0127727 | A1* | 5/2017 | Davidson | A61P 9/12 |
| 2017/0135400 | A1* | 5/2017 | Liu | A24F 40/53 |
| 2017/0135401 | A1 | 5/2017 | Dickens | |
| 2017/0135407 | A1* | 5/2017 | Cameron | A24F 40/60 |
| 2017/0135408 | A1* | 5/2017 | Cameron | A24F 40/51 |
| 2017/0135409 | A1* | 5/2017 | Cameron | A24F 1/02 |
| 2017/0135410 | A1* | 5/2017 | Cameron | H05B 3/12 |
| 2017/0135411 | A1* | 5/2017 | Cameron | A24F 40/50 |
| 2017/0135412 | A1* | 5/2017 | Cameron | A24F 40/51 |
| 2017/0136193 | A1* | 5/2017 | Cameron | A24F 40/48 |
| 2017/0136194 | A1* | 5/2017 | Cameron | A24F 40/05 |
| 2017/0136301 | A1* | 5/2017 | Cameron | A24F 40/65 |
| 2017/0143917 | A1* | 5/2017 | Cohen | A24F 40/40 |
| 2017/0150756 | A1* | 6/2017 | Rexroad | H05B 1/0244 |
| 2017/0157341 | A1* | 6/2017 | Pandya | A61M 11/042 |
| 2017/0181467 | A1* | 6/2017 | Cameron | A63F 13/98 |
| 2017/0181474 | A1* | 6/2017 | Cameron | A24B 15/167 |
| 2017/0181475 | A1* | 6/2017 | Cameron | A24F 40/53 |
| 2017/0185364 | A1* | 6/2017 | Cameron | G09G 5/12 |
| 2017/0196270 | A1* | 7/2017 | Vick | H02J 7/0042 |
| 2017/0208867 | A1* | 7/2017 | Li | G08C 17/02 |
| 2017/0215480 | A1* | 8/2017 | Qiu | A24F 40/65 |
| 2017/0224020 | A1* | 8/2017 | Fernando | A24F 40/95 |
| 2017/0231280 | A1* | 8/2017 | Anton | A24F 40/65<br>392/404 |
| 2017/0245550 | A1* | 8/2017 | Freelander | A61M 11/042 |
| 2017/0245554 | A1* | 8/2017 | Perez | A24F 40/40 |
| 2017/0251719 | A1* | 9/2017 | Cyphert | A24F 1/00 |
| 2017/0258136 | A1* | 9/2017 | Hawes | A24F 40/65 |
| 2017/0258142 | A1* | 9/2017 | Hatton | A24F 40/50 |
| 2017/0259170 | A1* | 9/2017 | Bowen | A24F 40/60 |
| 2017/0273357 | A1* | 9/2017 | Barbuck | H05B 3/04 |
| 2017/0280779 | A1* | 10/2017 | Qiu | G05D 23/1919 |
| 2017/0290998 | A1* | 10/2017 | Poston | A61M 11/047 |
| 2017/0295844 | A1* | 10/2017 | Thevenaz | A24F 40/46 |
| 2017/0303590 | A1* | 10/2017 | Cameron | A24F 40/00 |
| 2017/0303593 | A1* | 10/2017 | Cameron | A24F 40/60 |
| 2017/0303594 | A1* | 10/2017 | Cameron | A61M 15/00 |
| 2017/0309091 | A1* | 10/2017 | Cameron | G07C 5/085 |
| 2017/0332702 | A1* | 11/2017 | Cameron | A24F 40/65 |
| 2018/0042308 | A1 | 2/2018 | Takeuchi et al. | |
| 2018/0070639 | A1* | 3/2018 | Chen | F22B 1/281 |
| 2018/0184712 | A1* | 7/2018 | Fraser | A24F 40/465 |
| 2018/0192700 | A1* | 7/2018 | Fraser | A24F 40/57 |
| 2019/0042308 | A1 | 2/2019 | Kumar et al. | |
| 2019/0124979 | A1* | 5/2019 | Sebastian | A24F 40/465 |
| 2019/0200677 | A1* | 7/2019 | Chong | A24D 1/02 |
| 2019/0230987 | A1* | 8/2019 | Wu | H05B 6/36 |
| 2024/0225121 | A1* | 7/2024 | Sur | A24F 40/51 |

FOREIGN PATENT DOCUMENTS

| | | | |
|---|---|---|---|
| CN | 1541577 | A | 11/2004 |
| CN | 2719043 | Y | 8/2005 |
| CN | 200997909 | Y | 1/2008 |
| CN | 101116542 | A | 2/2008 |
| CN | 101176805 | A | 5/2008 |
| CN | 201379072 | Y | 1/2010 |
| CN | 103826756 | A | 5/2014 |
| CN | 104411875 | A | 3/2015 |
| CN | 104768407 | A | 7/2015 |
| DE | 102006004484 | A1 | 8/2007 |
| DE | 102006041042 | A1 | 3/2008 |
| DE | 202009010400 | U1 | 11/2009 |
| EP | 0295122 | A2 | 12/1988 |
| EP | 0430566 | A2 | 6/1991 |
| EP | 0845220 | A1 | 6/1998 |
| EP | 1618803 | A1 | 1/2006 |
| EP | 2316286 | A1 | 5/2011 |
| GB | 2469850 | A | 11/2010 |
| KR | 2005-0037919 | A | 4/2005 |
| RU | 2536115 | C2 | 12/2014 |
| RU | 2596108 | C1 | 8/2016 |
| WO | WO-1997048293 | A1 | 12/1997 |
| WO | WO-2003034847 | A1 | 5/2003 |
| WO | WO-2004043175 | A1 | 5/2004 |
| WO | WO-2004080216 | A1 | 9/2004 |
| WO | WO-2005099494 | A1 | 10/2005 |
| WO | WO-2007078273 | A1 | 7/2007 |
| WO | WO-2007131449 | A1 | 11/2007 |
| WO | WO-2009105919 | A1 | 9/2009 |
| WO | WO-2009155734 | A1 | 12/2009 |
| WO | WO-2010003480 | A1 | 1/2010 |
| WO | WO-2010045670 | A1 | 4/2010 |
| WO | WO-2010073122 | A1 | 7/2010 |
| WO | WO-2010118644 | A1 | 10/2010 |
| WO | WO-2010140937 | A1 | 12/2010 |
| WO | WO-2011010334 | A1 | 1/2011 |
| WO | WO-2012072762 | A1 | 6/2012 |
| WO | WO-2012085203 | A1 | 6/2012 |
| WO | WO-2012100523 | A1 | 8/2012 |
| WO | WO-2013042002 | A1 | 3/2013 |
| WO | WO-2013083634 | A1 | 6/2013 |
| WO | WO-2013089551 | A1 | 6/2013 |
| WO | WO-2014037794 | A2 | 3/2014 |
| WO | WO-2015153443 | A1 | 10/2015 |
| WO | WO-2017153270 | A1 | 9/2017 |

* cited by examiner

FLUIDIC CONTROL FOR AN AEROSOL DELIVERY DEVICE

CROSS REFERENCE TO RELATED APPLICATION

This application is a continuation of U.S. application Ser. No. 15/261,307, filed Sep. 9, 2016, which is hereby incorporated by reference herein in its entirety.

TECHNOLOGICAL FIELD

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from, or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0212232 to Bless et al., which is incorporated herein by reference. Additionally, various types of electrically powered aerosol and vapor delivery devices also have been proposed in U.S. Pat. Pub. Nos. 2014/0096781 to Sears et al. and 2014/0283859 to Minskoff et al., as well as U.S. patent application Ser. No. 14/282,768 to Sears et al., filed May 20, 2014; Ser. No. 14/286,552 to Brinkley et al., filed May 23, 2014; Ser. No. 14/327,776 to Ampolini et al., filed Jul. 10, 2014; and Ser. No. 14/465,167 to Worm et al., filed Aug. 21, 2014; all of which are incorporated herein by reference.

It would be desirable to provide functionality for control of a microfluidic system of an aerosol delivery device.

BRIEF SUMMARY

The present disclosure relates to aerosol delivery devices, methods of forming such devices, and elements of such devices. The present disclosure includes, without limitation, the following example implementations. In some example implementations, an aerosol delivery device is provided and comprises a housing defining a reservoir configured to retain aerosol precursor composition. Contained within the housing is a heating element controllable to activate and vaporize components of the aerosol precursor composition, a valve configured to control a flow of aerosol precursor composition from the reservoir to the heating element, a sensor configured to measure a reflectance or temperature of the heating element and generate a corresponding signal, and a control component. The control component is configured to receive the corresponding signal and determine a volume of aerosol precursor composition at the heating element based on the reflectance or temperature so measured. The control component is also configured to control the valve to decrease or increase a rate of the flow of aerosol precursor composition in response to the volume being respectively above or below a predetermined threshold volume.

In some example implementations of the aerosol delivery device of the preceding or any subsequent example implementation, or any combination thereof, the sensor is or includes an optical liquid-level sensor configured to measure the reflectance of light at the heating element, and the control component is configured to determine the volume of aerosol precursor composition based on the reflectance of light so measured.

In some example implementations of the aerosol delivery device of any preceding or any subsequent example implementation, or any combination thereof, the sensor is or includes a temperature sensor configured to measure the temperature of the heating element, and the control component is configured to determine the volume of aerosol precursor composition based on the temperature so measured.

In some example implementations of the aerosol delivery device of any preceding or any subsequent example implementation, or any combination thereof, the valve is or includes a single-phase induction motor having a motor speed that is variable and proportional to the rate of the flow of aerosol precursor composition, and the control component being configured to control the valve includes being configured to control the valve to respectively decrease or increase the motor speed and thereby the rate.

In some example implementations of the aerosol delivery device of any preceding or any subsequent example implementation, or any combination thereof, the predetermined threshold volume includes first and second threshold volumes, and the control component being configured to control the valve includes being configured to control the valve to decrease or increase the rate of the flow of aerosol precursor composition in response to the volume being respectively above the first threshold volume or below the second threshold volume.

In some example implementations of the aerosol delivery device of any preceding or any subsequent example implementation, or any combination thereof, the first and second threshold volumes are respectively 100 milliliters (mL) and 10 mL, and the control component being configured to control the valve to decrease or increase the rate includes being configured to control the valve to incrementally decrease or increase the rate until respectively the flow of aerosol precursor composition stops or the volume is greater than 100 mL.

In some example implementations of the aerosol delivery device of any preceding or any subsequent example implementation, or any combination thereof, the control component being configured to control the valve includes being configured to control the valve only in instances in which a flow of liquid through at least a portion of the housing is detected, and the aerosol delivery device further comprises a pressure sensor configured to measure a pressure of the flow of liquid and generate a second corresponding signal, and the control component is configured to receive the second corresponding signal and control the valve to further decrease or increase the rate of the flow of aerosol precursor composition in proportion to the pressure so measured.

In some example implementations of the aerosol delivery device of any preceding or any subsequent example implementation, or any combination thereof, the control component being configured to control the valve includes being configured to control the valve only in instances in which a flow of liquid through at least a portion of the housing is detected, and the aerosol delivery device further comprises pressure and humidity sensors configured to measure a pressure of the flow of liquid, a volumetric pressure, and a humidity of an environment of the aerosol delivery device, and generate second corresponding signals. The control component being configured to receive the corresponding signal further includes being configured to receive the second corresponding signals. The control component being configured to determine the volume of the aerosol precursor composition further includes being configured to determine an optimal rate of the flow of aerosol precursor composition based on the volume of the aerosol precursor composition so determined, and the pressure of the flow of liquid, the volumetric pressure and the humidity so measured. The control component being configured to control the valve to includes being configured to control the valve to decrease or increase the rate to match the optimal rate so determined.

In some example implementations of the aerosol delivery device of any preceding or any subsequent example implementation, or any combination thereof, the aerosol delivery device further comprises a liquid-flow sensor configured to measure the rate of the flow of aerosol precursor composition to the heating element, and a display controllable to present the rate so measured.

In some example implementations of the aerosol delivery device of any preceding or any subsequent example implementation, or any combination thereof, the reservoir is a refillable reservoir, and the aerosol delivery device further comprises a liquid-level sensor configured to measure a volume of the aerosol precursor composition within the refillable reservoir and generate a second corresponding signal, and a communication interface configured to enable wireless communication of the second corresponding signal or another signal that conveys the volume of the aerosol precursor composition within the refillable reservoir so measured to a remote ordering system configured to automatically order a container for refilling the reservoir in response to the volume being below a second predetermined threshold.

In some example implementations, a control body coupled or coupleable with a cartridge to form an aerosol delivery device is provided. The cartridge defines a reservoir configured to retain aerosol precursor composition, and is equipped with a heating element controllable to activate and vaporize components of the aerosol precursor composition and a valve configured to control a flow of aerosol precursor composition from the reservoir to the heating element. The control body comprises a housing and, within the housing, a sensor configured to measure a reflectance or temperature of the heating element and generate a corresponding signal, and a control component. The control component is configured to receive the corresponding signal and determine a volume of aerosol precursor composition at the heating element based on the reflectance or temperature so measured. The control component being configured to control the valve to decrease or increase a rate of the flow of aerosol precursor composition in response to the volume being respectively above or below a predetermined threshold volume.

In some example implementations of the control body of the preceding or any subsequent example implementation, or any combination thereof, the sensor is or includes an optical liquid-level sensor configured to measure the reflectance of light at the heating element, and the control component is configured to determine the volume of aerosol precursor composition based on the reflectance of light so measured.

In some example implementations of the control body of any preceding or any subsequent example implementation, or any combination thereof, the sensor is or includes a temperature sensor configured to measure the temperature of the heating element, and the control component is configured to determine the volume of aerosol precursor composition based on the temperature so measured.

In some example implementations of the control body of any preceding or any subsequent example implementation, or any combination thereof, the valve is or includes a single-phase induction motor having a motor speed that is variable and proportional to the rate of the flow of aerosol precursor composition, and the control component being configured to control the valve includes being configured to control the valve to respectively decrease or increase the motor speed and thereby the rate.

In some example implementations of the control body of any preceding or any subsequent example implementation, or any combination thereof, the predetermined threshold volume includes first and second threshold volumes, and the control component being configured to control the valve includes being configured to control the valve to decrease or increase the rate of the flow of aerosol precursor composition in response to the volume being respectively above the first threshold volume or below the second threshold volume.

In some example implementations of the control body of any preceding or any subsequent example implementation, or any combination thereof, the first and second threshold volumes are respectively 100 milliliters (mL) and 10 mL, and the control component being configured to control the valve to decrease or increase the rate includes being configured to control the valve to incrementally decrease or increase the rate until respectively the flow of aerosol precursor composition stops or the volume is greater than 100 mL.

In some example implementations of the control body of any preceding or any subsequent example implementation, or any combination thereof, the control component being configured to control the valve includes being configured to control the valve only in instances in which a flow of liquid through at least a portion of the housing is detected, the aerosol delivery device further comprises a pressure sensor configured to measure a pressure of the flow of liquid and generate a second corresponding signal, and the control component is configured to receive the second corresponding signal and control the valve to further decrease or increase the rate of the flow of aerosol precursor composition in proportion to the pressure so measured.

In some example implementations of the control body of any preceding or any subsequent example implementation, or any combination thereof, the control component being configured to control the valve includes being configured to control the valve only in instances in which a flow of liquid through at least a portion of the housing is detected, and the control body further comprises pressure and humidity sensors configured to measure a pressure of the flow of liquid, a volumetric pressure, and a humidity of an environment of the aerosol delivery device, and generate second corresponding signals. The control component being configured to receive the corresponding signal further includes being configured to receive the second corresponding signals, and the control component being configured to determine the volume of the aerosol precursor composition further includes being configured to determine an optimal rate of the flow of aerosol precursor composition based on the volume of the aerosol precursor composition so determined, and the pressure of the flow of liquid, the volumetric pressure and the humidity so measured. The control component being configured to control the valve to includes being configured to control the valve to decrease or increase the rate to match the optimal rate so determined.

In some example implementations of the control body of any preceding or any subsequent example implementation, or any combination thereof, the aerosol delivery device further comprises a liquid-flow sensor configured to measure the rate of the flow of aerosol precursor composition to the heating element, and a display controllable to present the rate so measured.

In some example implementations of the control body of any preceding or any subsequent example implementation, or any combination thereof, the reservoir is a refillable reservoir, and the aerosol delivery device further comprises a liquid-level sensor configured to measure a volume of the aerosol precursor composition within the refillable reservoir and generate a second corresponding signal, and a communication interface configured to enable wireless communication of the second corresponding signal or another signal that conveys the volume of the aerosol precursor composition within the refillable reservoir so measured to a remote ordering system configured to automatically order a container for refilling the reservoir in response to the volume being below a second predetermined threshold.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in the foregoing general terms, reference will now be made to the accompanying drawings, which are not necessarily drawn to scale, and wherein:

DETAILED DESCRIPTION

Figure 1:
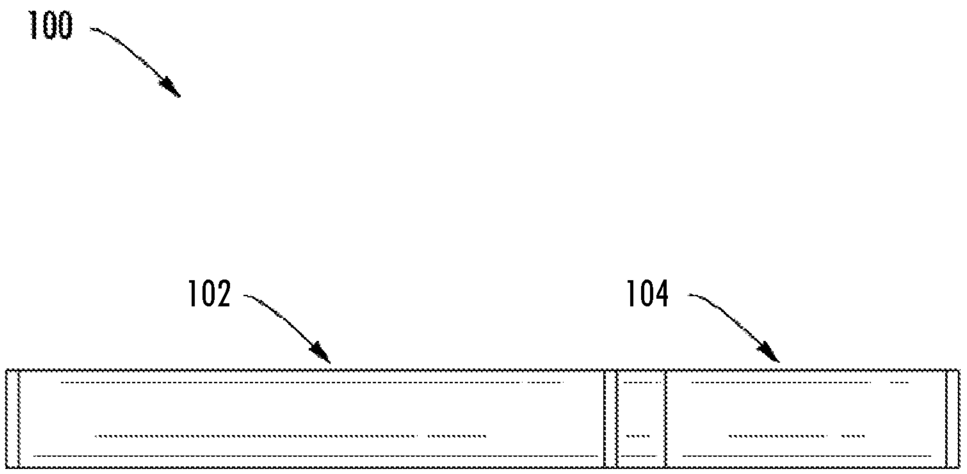
FIG. 1 illustrates a side view of an aerosol delivery device including a cartridge coupled to a control body according to an example implementation of the present disclosure.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, example implementations of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

Aerosol delivery systems of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or supercapacitor, and various electronics for controlling the operation of that article), and at the other end and removably coupleable thereto, an outer body or shell containing a disposable portion (e.g., a disposable flavor-containing cartridge).

Aerosol delivery systems of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

In various examples, an aerosol delivery device can comprise a reservoir configured to retain the aerosol precursor composition. The reservoir particularly can be formed of a porous material (e.g., a fibrous material) and thus may be referred to as a porous substrate (e.g., a fibrous substrate).

A fibrous substrate useful as a reservoir in an aerosol delivery device can be a woven or nonwoven material formed of a plurality of fibers or filaments and can be formed of one or both of natural fibers and synthetic fibers. For example, a fibrous substrate may comprise a fiberglass material a cellulose acetate material, a carbon material, a polyethylene terephthalate (PET) material, a rayon material, or an organic cotton material can be used. A reservoir may be substantially in the form of a container and may include a fibrous material included therein.

FIG. 1 illustrates a side view of an aerosol delivery device 100 including a control body 102 and a cartridge 104, according to various example implementations of the present disclosure. In particular, FIG. 1 illustrates the control body and the cartridge coupled to one another. The control body and the cartridge may be detachably aligned in a functioning relationship. Various mechanisms may connect the cartridge to the control body to result in a threaded engagement, a press-fit engagement, an interference fit, a magnetic engagement or the like. The aerosol delivery device may be substantially rod-like, substantially tubular shaped, or substantially cylindrically shaped in some example implementations when the cartridge and the control body are in an assembled configuration. The aerosol delivery device may also be substantially rectangular or rhomboidal in cross-section, which may lend itself to greater compatibility with a substantially flat or thin-film power source or supercapacitor, such as a power source including a flat battery. The cartridge and control body may include separate, respective housings or outer bodies, which may be formed of any of a number of different materials. The housing may be formed of any suitable, structurally-sound material. In some examples, the housing may be formed of a metal or alloy, such as stainless steel, aluminum or the like. Other suitable materials include various plastics (e.g., polycarbonate), metal-plating over plastic, ceramics and the like.

In some example implementations, one or both of the control body 102 or the cartridge 104 of the aerosol delivery device 100 may be referred to as being disposable or as being reusable. For example, the control body may have a replaceable battery, rechargeable battery (e.g., rechargeable thin-film solid state battery) or rechargeable supercapacitor, and thus may be combined with any type of recharging technology, including connection to a typical wall outlet, connection to a car charger (i.e., a cigarette lighter receptacle), connection to a computer, such as through a universal serial bus (USB) cable or connector, connection to a photovoltaic cell (sometimes referred to as a solar cell) or solar panel of solar cells, wireless connection to a Radio Frequency (RF), wireless connection to induction-based charging pads, or connection to a RF-to-DC converter. Further, in some example implementations, the cartridge may comprise a single-use cartridge, as disclosed in U.S. Pat. No. 8,910,639 to Chang et al., which is incorporated herein by reference.

Figure 2:
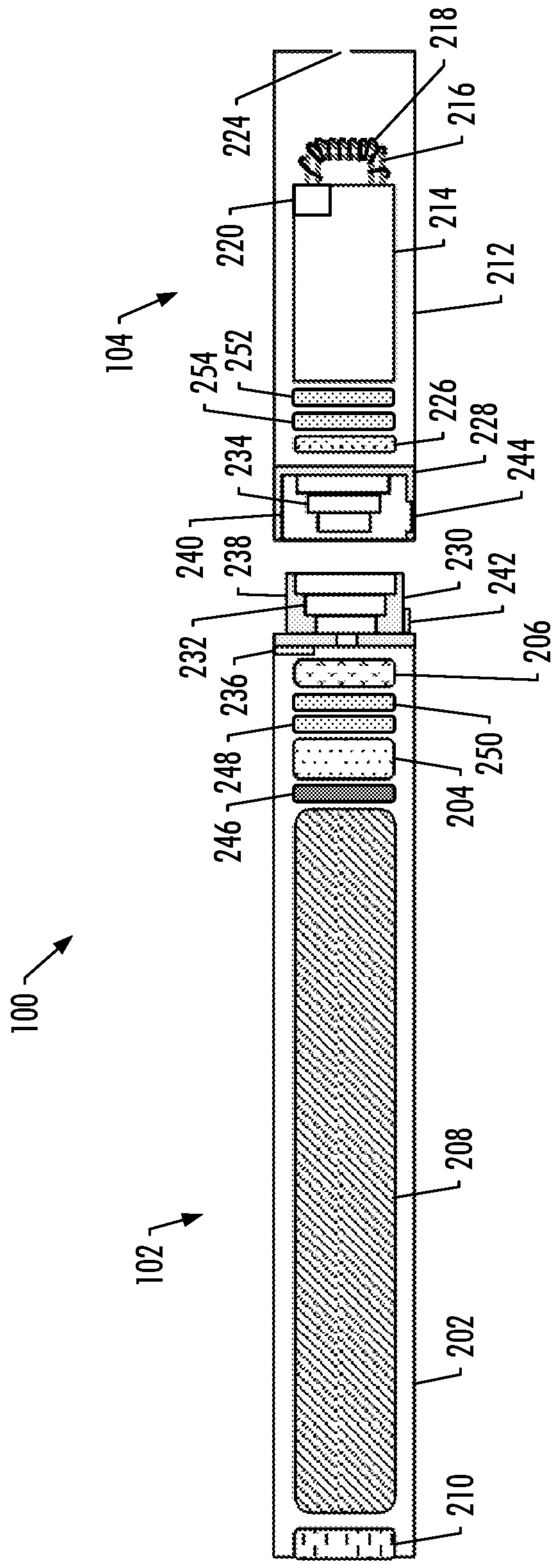
FIG. 2 is a partially cut-away view of the aerosol delivery device according to various example implementations.

FIG. 2 more particularly illustrates the aerosol delivery device 100, in accordance with some example implementations. As seen in the cut-away view illustrated therein, again, the aerosol delivery device can comprise a control body 102 and a cartridge 104 each of which include a number of respective components. The components illustrated in FIG. 2 are representative of the components that may be present in a control body and cartridge and are not intended to limit the scope of components that are encompassed by the present disclosure. As shown, for example, the control body can be formed of a control body shell 202 that can include a control component 204 (e.g., a microprocessor, individually or as part of a microcontroller), a flow sensor 206, a power source 208 and one or more light-emitting diodes (LEDs) 210, and such components can be variably aligned. The power source may include, for example, a battery (single-use or rechargeable), lithium-ion battery, solid-state battery (SSB), thin-film SSB, supercapacitor or the like, or some combination thereof. Some examples of a suitable power source are provided in U.S. patent application Ser. No. 14/918,926 to Sur et al., filed Oct. 21, 2015, which is incorporated herein by reference. The LED may be one example of a suitable visual indicator with which the aerosol delivery device 100 may be equipped. Other indicators such as audio indicators (e.g., speakers), haptic indicators (e.g., vibration motors) or the like can be included in addition to or as an alternative to visual indicators such as the LED.

The cartridge 104 can be formed of a cartridge shell 212 enclosing a reservoir 214 configured to retain the aerosol precursor composition, and including a heater 216 (sometimes referred to as a heating element). In various configurations, this structure may be referred to as a tank; and accordingly, the terms "cartridge," "tank" and the like may be used interchangeably to refer to a shell or other housing enclosing a reservoir for aerosol precursor composition, and including a heater.

As shown, in some examples, the reservoir 214 may be in fluid communication with a liquid transport element 218 adapted to wick or otherwise transport an aerosol precursor composition stored in the reservoir housing to the heater 216. In some examples, a valve 220 may be positioned between the reservoir and heater, and configured to control a flow of aerosol precursor composition from the reservoir to the heater.

Various examples of materials configured to produce heat when electrical current is applied therethrough may be employed to form the heater 216. The heater in some of these examples may be a resistive heating element such as a wire coil. Example materials from which the wire coil may be formed include titanium (Ti), platinum (Pt), nichrome (NiCrFe) Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns), silver palladium (AgPd) conductive inks, boron doped silica, and ceramics (e.g., positive or negative temperature coefficient ceramics). Example implementations of heaters or heating members useful in aerosol delivery devices according to the present disclosure are further described below, and can be incorporated into devices such as illustrated in FIG. 2 as described herein.

For example, in some implementations, the heater 216 includes an electrically-conductive carbon element disposed adjacent to a heat-conductive substrate, such as that disclosed in U.S. patent application Ser. No. 15/133,916 to Sur et al., filed Apr. 20, 2016, which is incorporated herein by reference. In such an arrangement, the heater may be configured to receive the aerosol precursor from the reservoir 214 onto the heat-conductive substrate. In this manner, the aerosol precursor may be delivered into engagement with or onto the heat-conductive substrate to form the aerosol in response to heat from the electrically-conductive carbon element conducted through the heat-conductive substrate. In some aspects, the liquid-transport element 218 may be operably engaged between the reservoir and the heat-conductive substrate, and configured to deliver the aerosol precursor from the reservoir and onto the heat-conductive substrate. In these implementations, the liquid-transport element may comprise, for example, a pump apparatus or a wick arrangement.

In one particular aspect, the reservoir 214 is configured to dispense the aerosol precursor on a surface of the heat-conductive substrate of the heater 216. Accordingly, in such instances, the heat-conductive substrate may have the electrically-conductive carbon element mounted on, applied to, or otherwise engaged with a surface of the heat conductive substrate, and the aerosol precursor may be dispensed by the liquid-transport element 218 onto an opposing surface of the heat-conductive substrate. The heat from the electrically-conductive carbon element is conducted through the heat-conductive substrate, wherein contact or other engagement between the aerosol precursor and the heated surface causes the aerosol precursor to form an aerosol in response to the heat. In some embodiments, the electrically-conductive carbon element may comprise an electrically-conductive graphene element, more particularly, an electrically conductive square graphene sheet or graphene foil, or a plurality of electrically conductive square graphene sheets or graphene foils stacked together.

An opening 224 may be present in the cartridge shell 212 (e.g., at the mouthend) to allow for egress of formed aerosol from the cartridge 104.

The cartridge 104 also may include one or more electronic components 226, which may include an integrated circuit, a memory component, a sensor, or the like. The electronic components may be adapted to communicate with the control component 204 and/or with an external device by wired or wireless means. The electronic components may be positioned anywhere within the cartridge or a base 228 thereof.

Although the control component 204 and the flow sensor 206 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the control body. In some examples, the air flow sensor may comprise its own circuit board or other base element to which it can be attached. In some examples, a flexible circuit board may be utilized. A flexible circuit board may be configured into a variety of shapes, include substantially tubular shapes. In some examples, a flexible circuit board may be combined with, layered onto, or form part or all of a heater substrate as further described below.

The control body 102 and the cartridge 104 may include components adapted to facilitate a fluid engagement therebetween. As illustrated in FIG. 2, the control body can include a coupler 230 having a cavity 232 therein. The base 228 of the cartridge can be adapted to engage the coupler and can include a projection 234 adapted to fit within the cavity. Such engagement can facilitate a stable connection between the control body and the cartridge as well as establish an electrical connection between the power source 208 and control component 204 in the control body and the heater 216 in the cartridge. Further, the control body shell 202 can include an air intake 236, which may be a notch in the shell where it connects to the coupler that allows for passage of ambient air around the coupler and into the shell where it then passes through the cavity 232 of the coupler and into the cartridge through the projection 234.

A coupler and a base useful according to the present disclosure are described in U.S. Pat. App. Pub. No. 2014/0261495 to Novak et al., which is incorporated herein by reference. For example, the coupler 230 as seen in FIG. 2 may define an outer periphery 238 configured to mate with an inner periphery 240 of the base 228. In one example the inner periphery of the base may define a radius that is substantially equal to, or slightly greater than, a radius of the outer periphery of the coupler. Further, the coupler may define one or more protrusions 242 at the outer periphery configured to engage one or more recesses 244 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some examples. In other examples, further shapes and dimensions are encompassed—e.g., a rectangular or triangular cross-section, multifaceted shapes, or the like.

The reservoir 214 illustrated in FIG. 2 can be a container or can be a fibrous reservoir, as presently described. For example, the reservoir can comprise one or more layers of nonwoven fibers substantially formed into the shape of a tube encircling the interior of the cartridge shell 212, in this example. An aerosol precursor composition can be retained in the reservoir. Liquid components, for example, can be sorptively retained by the reservoir. The reservoir can be in fluid connection with the liquid transport element 218. The liquid transport element can transport the aerosol precursor composition stored in the reservoir via capillary action to the heater 216 that is in the form of a metal wire coil in this example. As such, the heater is in a heating arrangement with the liquid transport element. Example implementations of reservoirs and transport elements useful in aerosol delivery devices according to the present disclosure are further described below, and such reservoirs and/or transport elements can be incorporated into devices such as illustrated in FIG. 2 as described herein. In particular, specific combinations of heating members and transport elements as further described below may be incorporated into devices such as illustrated in FIG. 2 as described herein.

In use, when a user draws on the aerosol delivery device 100, airflow is detected by the flow sensor 206, and the heater 216 is activated to vaporize components of the aerosol precursor composition. Drawing upon the mouthend of the aerosol delivery device causes ambient air to enter the air intake 236 and pass through the cavity 232 in the coupler 230 and the central opening in the projection 234 of the base 228. In the cartridge 104, the drawn air combines with the formed vapor to form an aerosol. The aerosol is whisked, aspirated or otherwise drawn away from the heater and out the opening 224 in the mouthend of the aerosol delivery device.

In some examples, the aerosol delivery device 100 may include a number of additional software-controlled functions. For example, the aerosol delivery device may include a power-source protection circuit configured to detect power-source input, loads on the power-source terminals, and charging input. The power-source protection circuit may include short-circuit protection, under-voltage lock out and/or over-voltage charge protection. The aerosol delivery device may also include components for ambient temperature measurement, and its control component 204 may be configured to control at least one functional element to inhibit power-source charging—particularly of any battery—if the ambient temperature is below a certain temperature (e.g., 0° C.) or above a certain temperature (e.g., 45° C.) prior to start of charging or during charging.

Power delivery from the power source 208 may vary over the course of each puff on the device 100 according to a power control mechanism. The device may include a "long puff" safety timer such that in the event that a user or component failure (e.g., flow sensor 206) causes the device to attempt to puff continuously, the control component 204 may control at least one functional element to terminate the puff automatically after some period of time (e.g., four seconds). Further, the time between puffs on the device may be restricted to less than a period of time (e.g., 100 seconds). A watchdog safety timer may automatically reset the aerosol delivery device if its control component or software running on it becomes unstable and does not service the timer within an appropriate time interval (e.g., eight seconds). Further safety protection may be provided in the event of a defective or otherwise failed flow sensor 206, such as by permanently disabling the aerosol delivery device in order to prevent inadvertent heating. A puffing limit switch may deactivate the device in the event of a pressure sensor fail causing the device to continuously activate without stopping after the four second maximum puff time.

The aerosol delivery device 100 may include a puff tracking algorithm configured for heater lockout once a defined number of puffs has been achieved for an attached cartridge (based on the number of available puffs calculated in light of the e-liquid charge in the cartridge). The aerosol delivery device may also contain a sensor chip that measures, in real-time, the amount of aerosol precursor in the reservoir. If the aerosol precursor composition level is substantially low, or the reservoir is empty, the aerosol delivery device may prevent current from being delivered and thereby prevent overheating the heating element. The aerosol delivery device may include a sleep, standby or low-power mode function whereby power delivery may be automatically cut off after a defined period of non-use. Further safety protection may be provided in that all charge/discharge cycles of the power source 208 may be monitored by the control component 204 over its lifetime. After the power source has attained the equivalent of a predetermined number (e.g., 200) of full discharge and full recharge cycles, it may be declared depleted, and the control component may control at least one functional element to prevent further charging of the power source. The aerosol device may also have a mechanical switch or a proximity based sensor switch to activate the heater 216 in lieu of a flow sensor configured to detect the flow of air through the aerosol delivery device and thereby effect activation of the heater.

The various components of an aerosol delivery device according to the present disclosure can be chosen from components described in the art and commercially available. Examples of batteries that can be used according to the disclosure are described in U.S. Pat. App. Pub. No. 2010/0028766 to Peckerar et al., which is incorporated herein by reference.

The aerosol delivery device 100 can incorporate the sensor 206 or another sensor or detector for control of supply of electric power to the heater 216 when aerosol generation is desired (e.g., upon draw during use). As such, for example, there is provided a manner or method of turning off power to the heater when the aerosol delivery device is not be drawn upon during use, and for turning on power to actuate or trigger the generation of heat by the heater during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference.

The aerosol delivery device 100 most preferably incorporates the control component 204 or another control mechanism for controlling the amount of electric power to the heater 216 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. App. Pub. No. 2009/0230117 to Fernando et al., U.S. Pat. App. Pub. No. 2014/0060554 to Collet et al., U.S. Pat. App. Pub. No. 2014/0270727 to Ampolini et al., and U.S. patent application Ser. No. 14/209,191 to Henry et al., filed Mar. 13, 2014, all of which are incorporated herein by reference.

Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. patent application Ser. No. 14/011,992 to Davis et al., filed Aug. 28, 2013, and U.S. patent application Ser. No. 14/170,838 to Bless et al., filed Feb. 3, 2014, all of which are incorporated herein by reference. Additionally, various wicking materials, and the configuration and operation of those wicking materials within certain types of electronic cigarettes, are set forth in U.S. Pat. App. Pub. No. 2014/0209105 to Sears et al., which is incorporated herein by reference.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al.; 2014/0060554 to Collett et al.; 2015/0020423 to Lipowicz et al.; and 2015/0020430 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Imperial Tobacco Group PLC, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

Additional representative types of components that yield visual cues or indicators may be employed in the aerosol delivery device 100, such as visual indicators and related components, audio indicators, haptic indicators and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. patent application Ser. No. 14/173,266 to Sears et al., filed Feb. 5, 2014, all of which are incorporated herein by reference.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2005/0016550 to Katase, U.S. Pat. App. Pub. No. 2010/0163063 to Fernando et al., U.S. Pat. App. Pub. No. 2013/0192623 to Tucker et al., U.S. Pat. App. Pub. No. 2013/0298905 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., and U.S. Pat. App. Pub. No. 2014/0261408 to DePiano et al., all of which are incorporated herein by reference.

The control component 204 includes a number of electronic components, and in some examples may be formed of a printed circuit board (PCB) that supports and electrically connects the electronic components. The electronic components may include a microprocessor or processor core, and a memory. In some examples, the control component may include a microcontroller with integrated processor core and memory, and may further include one or more integrated input/output peripherals. In some examples, the control component may be coupled to a communication interface 246 to enable wireless communication with one or more networks, computing devices or other appropriately-enabled devices. Examples of suitable communication interfaces are disclosed in U.S. patent application Ser. No. 14/638,562, filed Mar. 4, 2015, to Marion et al., which is incorporated herein by reference. And examples of suitable manners according to which the aerosol delivery device may be configured to wirelessly communicate are disclosed in U.S. patent application Ser. No. 14/327,776, filed Jul. 10, 2014, to Ampolini et al., and U.S. patent application Ser. No. 14/609,032, filed Jan. 29, 2015, to Henry, Jr. et al., all of which are incorporated herein by reference.

As previously indicated, in some examples, a valve 220 may be positioned between the reservoir 214 and heater 216, and configured to control a flow of aerosol precursor composition from the reservoir to the heater. In at least some of these examples, the control body 102 may include a sensor 248 configured to measure a reflectance (e.g., reflectance of light) at, or temperature of, the heater, from which the control component 204 may determine a volume of aerosol precursor composition at the heater and control the valve.

Figure 3:
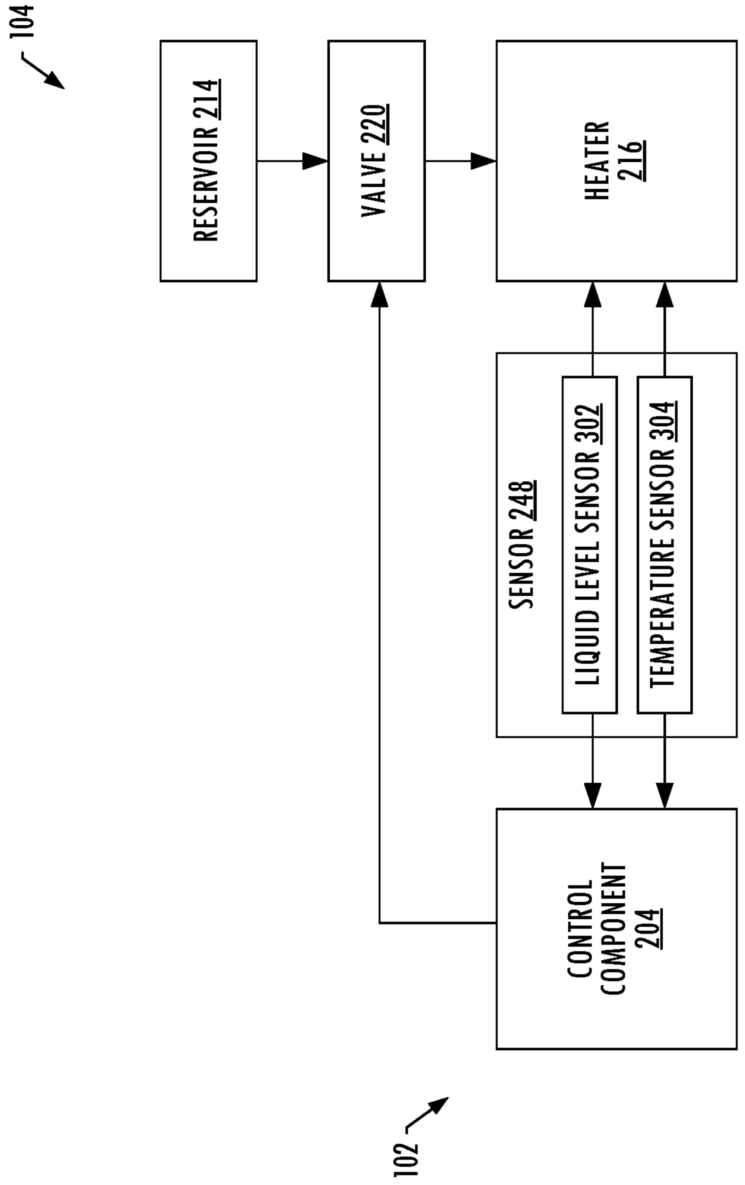
FIGS. 3, 4 and 5 more particularly illustrate the cartridge and control body of FIG. 1 according to various example implementations.
Figure 4:
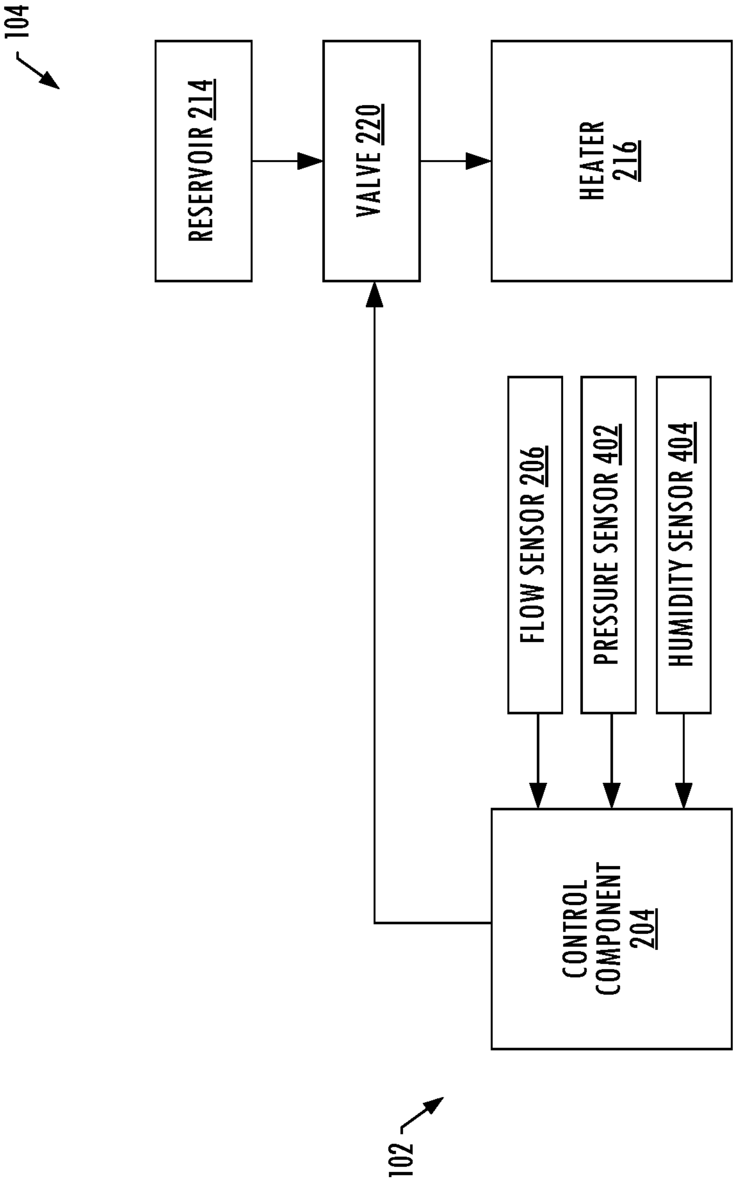
Figure 5:
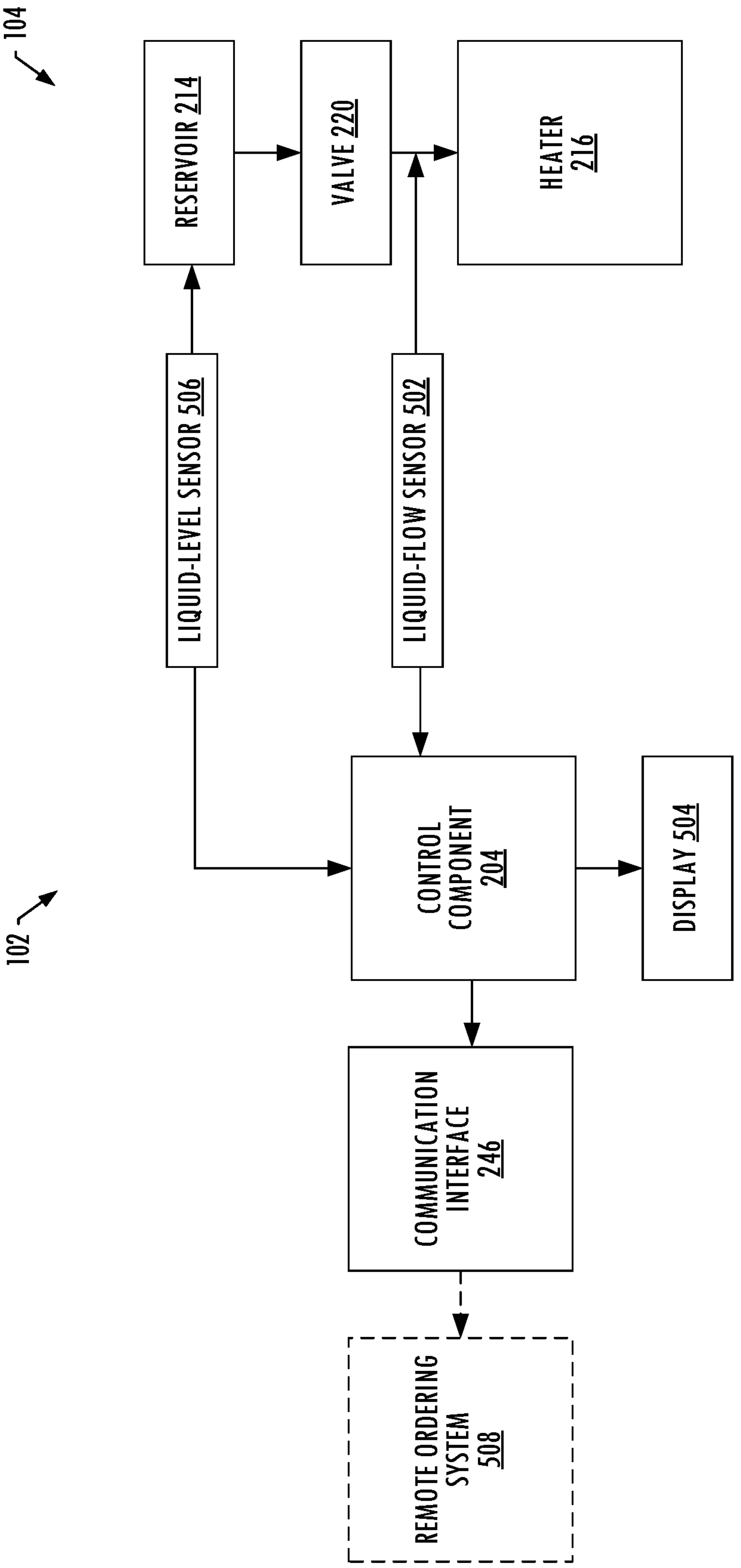

FIGS. 3, 4 and 5 more particularly illustrate various components of the control body 102 and the cartridge 104, according to example implementations of the present disclosure. As shown in FIG. 3, the sensor 248 may be configured to measure a reflectance or temperature of the heater 216 and generate a corresponding signal (i.e., a signal corresponding to the reflectance or temperature so measured). The control component 204 may be configured to receive the corresponding signal and determine a volume of aerosol precursor composition at the heater based on the reflectance or temperature so measured. And the control component may be configured to control the valve 220 to decrease or increase a rate of the flow (volumetric flow rate) of aerosol precursor composition in response to the volume being respectively above or below a predetermined threshold volume.

In some examples, the predetermined threshold volume includes first and second threshold volumes, and the control component 204 may control the valve 220 to decrease or increase the rate of the flow of aerosol precursor composition in response to the volume being respectively above the first threshold volume or below the second threshold volume. According to some examples, the first and second threshold volumes may respectively be 100 milliliters (mL) and 10 mL. Further, in some examples, and the control component may control the valve to incrementally decrease or increase the rate until respectively the flow of aerosol precursor composition stops or the volume is greater than the first threshold volume (e.g., 100 mL).

In some example implementations, the valve 220 is or includes a single-phase induction motor having a motor speed that is variable and proportional to the rate of the flow of aerosol precursor composition. In these examples, the control component 204 may control the valve to respectively decrease or increase the motor speed and thereby the rate of the flow of aerosol precursor composition.

As also shown in FIG. 3, in some examples, the sensor 248 is or includes an optical liquid-level sensor 302 configured to measure the reflectance of light the heater 216 (e.g., the reflectance of the heater through the liquid thereat), and which may include an inductive-capacitive resonant circuit. Examples of suitable optical liquid-level sensors are disclosed in U.S. Pat. No. 4,354,180 to Harding and U.S. Pat. No. 5,054,319 to Fling, which are incorporated herein by reference. Examples of suitable optical liquid-level sensors may include the Digital Ambient Light Sensor (ALS) with High Precision Human Eye Response (OPT3001) commercial product manufactured by Texas Instruments.

In these examples, the control component 204 may be configured to determine the volume of aerosol precursor composition based on the reflectance so measured. Various methods may be utilized to determine the volume of aerosol precursor composition at the heater 216 from the measured reflectance. For example, in an instance in which the sensor 248 includes the optical liquid-level sensor 302, when the volume of aerosol precursor composition at the heater 216 is high, the lux value of luminescence is low because the aerosol precursor composition (liquid) absorbs the light at the heater. In an instance in which there is no aerosol precursor composition at the heater, the light shines through the sensor and the lux value of luminescence is high and thereby indicates that the volume of aerosol precursor composition at the heating element is low. In some implementations, at least a portion of the heater may be marked such that the marking may point to the volume being half-full, full or empty based on the reflectance of light at the heater. Accordingly, as used herein, determining the volume of aerosol precursor composition may refer to determining a relative volume of aerosol precursor composition at the heating element.

In some examples, the sensor 248 is or includes a temperature sensor 304 configured to measure the temperature of the heater 216. In these examples, the control component may be configured to determine the volume of aerosol precursor composition based on the temperature so measured. Various methods may be utilized to determine the volume of aerosol precursor composition at the heater 216 from the measured temperature. For example, if the volume of aerosol precursor composition at the heater is constant, then the measured temperature is also constant provided the current delivered thereto is constant throughout a given puff duration. If the temperature increases it indicates that the volume of aerosol precursor composition at the heater is low. If the temperature decreases it indicates more aerosol precursor composition may be available than required and thus the liquid-level at the heater should be decreased. Examples of suitable temperature sensors may include the Multi-Sensor High Accuracy Digital Temperature Measurement System (LTC2983) commercial product manufactured by Linear Technology. In some examples in which the temperature sensor is coupled with a resistance temperature detector (RTD) or thermocouple, the temperature sensor may measure temperature up to 800 degrees Celsius.

It should be noted that while the illustrated implementation of FIG. 3 includes both the optical liquid-level sensor 302 and the temperature sensor 304, the sensor 248 of example implementations discussed herein may be or include either or both the optical liquid-level sensor and the temperature sensor. For instance, in some example implementations, the optical liquid-level sensor may be utilized as a primary sensor for determining the volume of aerosol precursor composition at the heater 216, and the temperature sensor may be only utilized as a back-up sensor in the event that the optical liquid-level sensor malfunctions.

As previously indicated, the control component 204 is configured to control the valve 220 based on the volume of aerosol precursor composition at the heater 216. In some example implementations, the control component may be configured to control the valve 220 only in instances in which a flow of liquid through at least a portion of the aerosol delivery device 100 is detected by the flow sensor 206. In these examples, the control body may include a number of sensors in addition to the sensor 248 for further control of the valve. As illustrated in FIG. 4, for example, the control body 102 may include a pressure sensor 402 configured to measure a pressure of the flow of liquid through the aerosol delivery device and generate a second signal corresponding to the pressure so measured. Suitable pressure sensors may include the Single Channel, 0.5 to 1 Msps, 12-Bit A/D Converter (ADC121S101) and 16-Bit, 50 to 250 kSPS, Differential Input, MicroPower ADC (ADC161S626) commercial products manufactured by Texas Instruments. In these examples, the liquid flow rate may be directly proportional to the pressure. The control component may be configured to receive the second corresponding signal and control the valve to further decrease or increase the rate of the flow of aerosol precursor composition in proportion to the pressure so measured.

In another example, the pressure sensor 402 may be configured to measure a pressure of the flow of liquid through the aerosol delivery device and an atmospheric pressure and generate second signals corresponding to respectively the pressure of the flow of liquid and the volumetric pressure (e.g., volumetric liquid pressure). In these examples, the pressure is inversely proportional to the liquid flow rate such that a single sensor may be utilized to measure the pressure and liquid flow rate. The control body may also comprise a humidity sensor 404 configured to measure a humidity of the environment and generate a second signal corresponding to the humidity so measured.

In these implementations, the control component 204 may be configured to receive the second corresponding signals, and determine an optimal rate of the flow of aerosol precursor composition based on the volume of the aerosol precursor composition so determined, and the pressure of the flow of liquid, the volumetric pressure and the humidity so measured. In some examples, an optimal rate of the flow of aerosol precursor composition may include a constant rate of the flow of aerosol precursor composition. In these examples, various methods may be utilized to determine the optimal rate based on a number of parameters. For example, by providing a constant volume of aerosol precursor composition over a puff duration, the rate of flow may be constant (e.g., optimal rate=volume/puff duration). In some examples, the volume may be determined by a cross-sectional area, depth or thickness of the aerosol precursor composition such that by providing a constant cross-sectional area, depth or thickness, and puff duration, the rate of the flow of aerosol precursor composition may be constant. The control component may then control the valve 220 to decrease or increase the rate to match the optimal rate so determined. It should be noted that as discussed herein a "match" may be or include a substantial or approximate match of the optimal rate with respect to and within an acceptable error of the design specifications of the valve, engineering tolerances, and the like.

In addition to the valve 220, other functional element(s) of the aerosol delivery device 100 may be controlled in any of a number of different manners. As shown in FIG. 5, for example, a display 502 may be controlled to present the rate of the flow of aerosol precursor composition to the heater 216. In particular, the control body 102 may comprise a liquid-flow sensor 502 configured to measure the rate of the flow of aerosol precursor composition to the heater, and a display 504 controllable to present the rate so measured. That is, the control component 204 may control the display to present the rate so measured.

As another example, the reservoir 214 may be a refillable reservoir and the control body 102 may comprise a liquid-level sensor 506 configured to measure a volume of the aerosol precursor composition within the refillable reservoir and generate a second signal corresponding signal. In these examples, the communication interface 246 may be configured to enable wireless communication of the second corresponding signal or another signal that conveys the volume of the aerosol precursor composition within the refillable reservoir so measured to a remote ordering system 508. The remote ordering system may then be configured to automatically order a container for refilling the reservoir in response to the volume being below a second predetermined threshold. In some of these examples, the communication interface may further initiate payment of the order using near-field communication.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1-5 or as otherwise described above may be included in an aerosol delivery device according to the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aerosol delivery device comprising:

a reservoir configured to retain an aerosol precursor composition;

an atomizer controllable to activate and vaporize components of the aerosol precursor composition;

a sensor comprising a temperature sensor configured to measure the temperature of the atomizer and generate a corresponding signal; and a control component configured to receive the corresponding signal and determine a volume of aerosol precursor composition at the atomizer, distinct from aerosol precursor composition in the reservoir, based on the temperature so measured, the control component being configured to control at least one functional element of the aerosol delivery device in response to the volume of aerosol precursor composition being above or below a threshold value.

2. The aerosol delivery device of claim 1, wherein the sensor is further configured to measure an additional characteristic of the aerosol delivery device and generate another corresponding signal, wherein the additional characteristic comprises at least one of the flow rate of the aerosol precursor composition, a pressure of the flow of the aerosol precursor composition, a volumetric pressure of the aerosol precursor composition, or a humidity of an environment of the aerosol delivery device.

3. The aerosol delivery device of claim 1, wherein the sensor further comprises an optical liquid-level sensor configured to measure the reflectance of light at the atomizer, and the control component is configured to determine a volume of aerosol precursor composition based on the reflectance so measured that indicates a lux value of luminescence.

4. The aerosol delivery device of claim 1 further comprising a valve configured to control a flow of the aerosol precursor composition from the reservoir to the atomizer.

5. The aerosol delivery device of claim 4, wherein the control component is further configured to control the valve to decrease or increase a rate of the flow of the aerosol precursor composition in response to the volume of aerosol precursor composition being above or below the threshold value.

6. The aerosol delivery device of claim 1 further comprising:

a liquid-flow sensor configured to measure the rate of the flow of aerosol precursor composition to the atomizer; and a display controllable to present the rate so measured.

7. The aerosol delivery device of claim 1, wherein the reservoir is a refillable reservoir, and the aerosol delivery device further comprises:

a liquid-level sensor configured to measure a volume of the aerosol precursor composition within the refillable reservoir and generate a second corresponding signal; and a communication interface configured to enable wireless communication of the second corresponding signal or another signal that conveys the volume of the aerosol precursor composition within the refillable reservoir so measured to a remote ordering system configured to automatically order a container for refilling the reservoir in response to the volume being below a second predetermined threshold.

8. The aerosol delivery device of claim 4, wherein the valve is or includes a single-phase induction motor having a motor speed that is variable and proportional to the rate of the flow of aerosol precursor composition, and wherein the control component being configured to control the valve includes being configured to control the valve to respectively decrease or increase the motor speed and thereby the rate.

9. A control body coupled or coupleable with a cartridge to form an aerosol delivery device, the cartridge defining a reservoir configured to retain an aerosol precursor composition, and being equipped with an atomizer controllable to activate and vaporize components of the aerosol precursor composition, the control body comprising:

a housing; and within the housing, a sensor comprising a temperature sensor configured to measure the temperature of the atomizer and generate a corresponding signal; and a control component configured to receive the corresponding signal and determine a volume of aerosol precursor composition at the atomizer, distinct from aerosol precursor composition in the reservoir, based on the temperature so measured, the control component being configured to control at least one functional element of the aerosol delivery device in response to the volume of aerosol precursor composition being above or below a threshold value.

10. The control body of claim 9, wherein the sensor is further configured to measure an additional characteristic of the aerosol delivery device and generate another corresponding signal, wherein the additional characteristic comprises at least one of the flow rate of the aerosol precursor composition, a pressure of the flow of the aerosol precursor composition, a volumetric pressure of the aerosol precursor composition, or a humidity of an environment of the aerosol delivery device.

11. The control body of claim 9, wherein the sensor further comprises an optical liquid-level sensor configured to measure the reflectance of light at the atomizer, and the control component is configured to determine a volume of aerosol precursor composition based on the reflectance so measured that indicates a lux value of luminescence.

12. The control body of claim 9, wherein the control component is further configured to control a valve to decrease or increase a rate of the flow of the aerosol precursor composition from the reservoir to the atomizer in response to the volume of aerosol precursor composition being above or below the threshold value.

13. The control body of claim 9, further comprising:

a liquid-flow sensor configured to measure the rate of the flow of aerosol precursor composition to the atomizer; and a display controllable to present the rate so measured.

14. The control body of claim 9, wherein the reservoir is a refillable reservoir, and the control body further comprises:

a liquid-level sensor configured to measure a volume of the aerosol precursor composition within the refillable reservoir and generate a second corresponding signal; and a communication interface configured to enable wireless communication of the second corresponding signal or another signal that conveys the volume of the aerosol precursor composition within the refillable reservoir so measured to a remote ordering system configured to automatically order a container for refilling the reservoir in response to the volume being below a second predetermined threshold.

* * * * *